Figure 1:
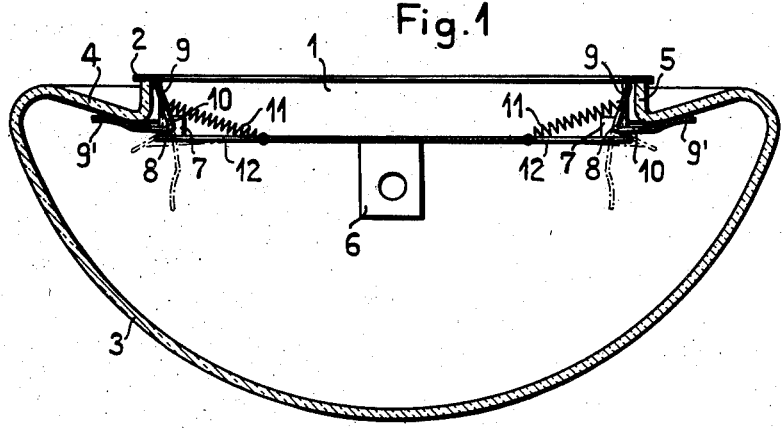

May 19, 1959 A. FREI 2,887,569

LAMP BOWL SUPPORT

Filed April 3, 1956

INVENTOR.
ANDRE FREI
BY

United States Patent Office 2,887,569
Patented May 19, 1959

2,887,569

LAMP BOWL SUPPORT

André Frei, Adliswil, Switzerland, assignor to Belmag Zurich Beleuchtungs-U. Metallindustrie, A.G., Zurich, Switzerland Application April 3, 1956, Serial No. 575,773

Claims priority, application Switzerland May 25, 1955

2 Claims. (Cl. 240—128)

In lamps in which there is provided a bowl of ground glass completely covering a carrier supporting the socket of an electric lamp and attachment means for the bowl, the attachment of the bowl to the carrier presents certain difficulties. Screwing the bowl onto a thread of the carrier does not provide sufficient security, as it is not possible to observe whether or not the bowl is correctly and completely screwed on.

Attachment devices for the bowls of such lamps have been proposed, in which sliding bolts provided on the carrier engage under the inwardly bent-over rim of the bowl. These bolts are actuated by a turning lever or a push rod. When such devices are employed, it frequently happens that the bolts fail to properly engage under the inwardly bent-over rim of the bowl, so that the bowl is not held securely. Furthermore, in these devices the turning lever or push rod is visible, which is an undesirable feature. The object of this invention is to overcome these disadvantages.

The present invention relates to an electric all-glass lamp, wherein there are provided at the periphery of its carrier at least two holding devices for a bowl having an inwardly bent-over marginal part, one of the holding devices having a two-armed lever mounted so as to be capable of rocking on the carrier, and acted on by a spring. The lever is provided with one arm which bears yieldingly against the inside of the inwardly bent-over marginal part of the bowl, when in position on the carrier, and thus holds the bowl firmly on the carrier, while for removing the bowl from the carrier, the cranked lever is rocked over, the power of the spring acting on it being overcome, while its other arm engages over the rim of the bowl. After a point of maximum tension of the spring has been exceeded, this other arm is drawn by this spring into an extreme position determined by a stop, in which position the arm of the cranked lever previously resting against the inside of the marginal part of the bowl is rocked inwards in such a manner that it lies completely within the opening of the bowl and releases the bowl, while the other arm of the two-armed lever projects laterally over the rim of the bowl.

In such an electric lamp the attachment of the bowl on the carrier is effected automatically and with complete security as the bowl is pressed against the carrier, the two-armed lever or levers being shifted by the bowl itself from a ready position into the locked position. The bowl can, without the holding devices being released, be drawn off the carrier by overcoming the force of the springs acting on the two-armed lever. The lever of the holding member or of the holding members may then be brought back into the ready position for remounting the bowl. In the electric all-glass lamp of my construction all parts of the holding device are completely invisible, when the bowl is attached to the carrier.

Figure 2:
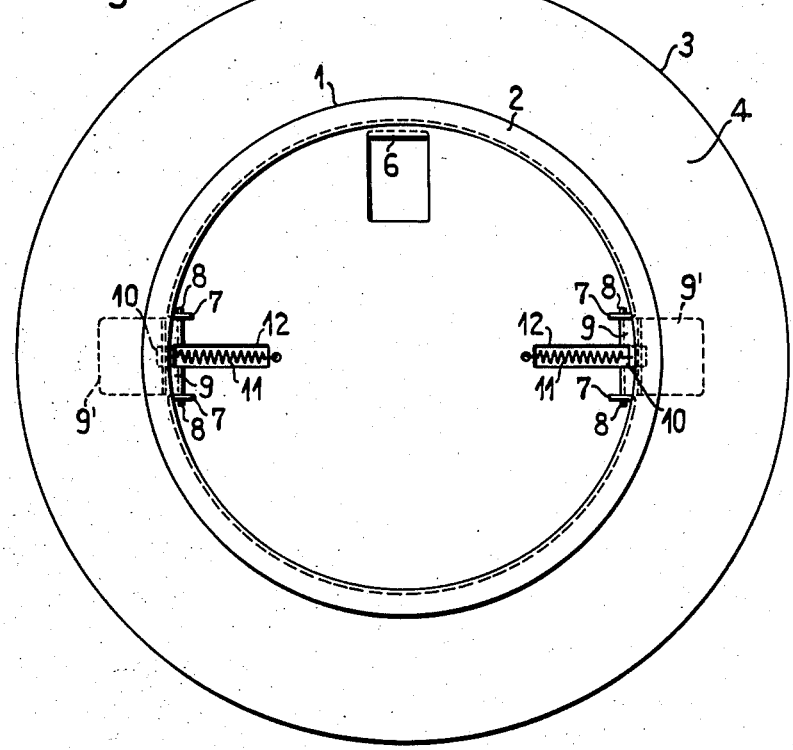

One form of construction according to the invention is illustrated in the accompanying drawing by way of example, in which:

Figure 1 is a vertical sectional view through the middle of an electric lamp employing the concepts of the present invention; and Figure 2 is a plan view of the lamp.

The illustrated electric lamp has a dish-shaped, cylindrical carrier 1 with an outwardly extending rim 2 which is intended to be fixed to a ceiling or a wall and a bowl 3 of translucent material, such as ground glass, or synthetic plastic material. The bowl is provided with an inwardly bent-over marginal part 4. The marginal part 4 of the bowl 3 has a cylindrical neck part 5 which embraces the carrier 1 with ample clearance. Out of the bottom of the carrier 1 a flap 6 is stamped and bent downward at a right angle, to which the fitting of an electric lamp, not shown in the drawing, is fixed. At each of two diametrically opposed points of the cylindrical wall of the carrier 1 two flaps 7 are formed by cutting out part of the wall of the carrier 1, and the flaps 7 are bent inwardly parallel to one another. In flaps 7 bearing holes for the spindle journals 8 are provided. The spindle journals extend through a two-armed lever formed of a metal strip, the arms of which, marked 9 and 9', form with one another an angle of slightly less than 90°. The arms 9 and 9' of the levers can be swung in the cut-away place of the cylindrical wall and in a cut-away place adjacent to it in the marginal part of the bottom of the carrier 1. Each lever 9, 9' is formed with a slot 10 which extends beyond its angle and in which a tension spring 11 can move. One end of the spring is attached to the arm 9 of the lever 9, 9' and its other end is secured to the end of a slot-shaped cut-out 12 provided in the bottom of the carrier 1.

When the bowl 3 is attached to the carrier 1, the arms 9' of the levers 9, 9' bear under the action of the tension springs 11 resiliently against the inside of the marginal part 4 of the bowl 3 and press its neck part 5 against the rim 2 of the carrier 1. The bowl 3 is thus held firmly against the carrier 1. When it is desired to remove bowl 3 from the carrier 1, the bowl is simply pulled straight in a downward direction. At the same time the levers 9, 9' are rocked downwardly, stressing the tension springs 11, while their arms 9 engage over the rim of the neck part 5 of the bowl 3. The tension springs 11 enter the cut-out places 12 in the bottom of the carrier 1 and, when they exceed the point of their greatest stress, draw the two-armed levers 9, 9' automatically into the position shown in Figure 1 in dotted lines, in which their arms 9' strike at the end of the cut-out in the wall of the carrier. The arms 9' will then be directed downwards and no longer make contact with the marginal part 4 of the bowl 3, so that the bowl 3 is no longer held on the carrier 1 and can be removed. When the bowl 3 is to be again attached to the carrier 1, it is simply pushed from below against the latter. At the same time the rim of the neck part 5 of the bowl 3 forces the arms 9 of the cranked levers 9, 9', from a lateral position (Figure 1, dotted lines) upwards, stressing the tension springs 11. As soon as the tension springs 11 exceed the point of their greatest stress, they draw the levers 9, 9' into their other extreme position, in which the arms 9' force the marginal part 4 of the bowl 3 upwards and the neck part 5 of the latter against the rim 2 of the carrier 1.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A lighting fixture comprising a substantially flat circular support member formed with a circular rim portion terminating in an outwardly extending attaching flange, said support member and said rim portion each having mutually communicating slotted openings at two diametrically opposite points thereof; a shade-bowl having an open end with an inwardly extending circular flange terminating in a cylindrically shaped neck portion enclosing said rim portion, a pair of two-armed shade-bowl supporting levers swingably mounted in each of said openings of said rim portion, each of said levers having one end thereof supporting said inwardly extending flange of said shade-bowl, and a pair of springs each respectively secured to the other end of each of said levers and to said circular support member maintaining said levers under tension in shade-bowl supporting position engaging said flange, each of said levers swinging to a releasing position by said inwardly extending flange of said shade-bowl past the point of greatest stress on said springs when said bowl is withdrawn from said support member with said one end of each of said levers being rotated through said communicating slotted openings in both said rim portion and said support member to a position with said one end extending perpendicular to said circular support member and said other end extending laterally with respect to said circular support member.

2. A lighting fixture comprising a substantially flat circular support member formed with a circular rim portion terminating in an outwardly extending attaching flange, said support member and said rim portion each having mutually communicating slotted openings at two diametrically opposite points thereof; a shade-bowl having an open end with an inwardly extending circular flange terminating in a cylindrically shaped neck portion enclosing said rim portion, a pair of two-armed shade-bowl supporting levers swingably mounted in each of said openings of said rim portion, each of said levers having one end thereof supporting said inwardly extending flange of said shade-bowl, a pair of springs each respectively secured to the other end of each of said levers and to said circular support member maintaining said levers under tension in shade-bowl supporting position engaging said flange, each of said levers swinging to a releasing position by said inwardly extending flange of said shade-bowl past the point of greatest stress on said springs when said bowl is withdrawn from said support member with said one end of each of said levers being rotated through said communicating slotted openings in both said rim portion and said support member to a position with said one end extending perpendicular to said circular support member and said other end extending laterally with respect to said circular support member, journals integral with and extending inwardly of said rim portion adjacent said slotted openings, and spindles in said journals, said levers being rotatably mounted on said journals.

References Cited in the file of this patent
UNITED STATES PATENTS

| | | |
|---|---|---|
| 1,494,575 | Benjamin | May 20, 1924 |
| 1,753,374 | Guth | Apr. 8, 1930 |
| 1,906,608 | Jaffe | May 2, 1933 |
| 2,146,637 | MacFadden | Feb. 7, 1939 |